Jan. 28, 1964 J. G. V. ISABEAU 3,119,930
EXTRAPOLATOR AND A METHOD OF EXTRAPOLATING
Filed Nov. 3, 1958 7 Sheets-Sheet 1
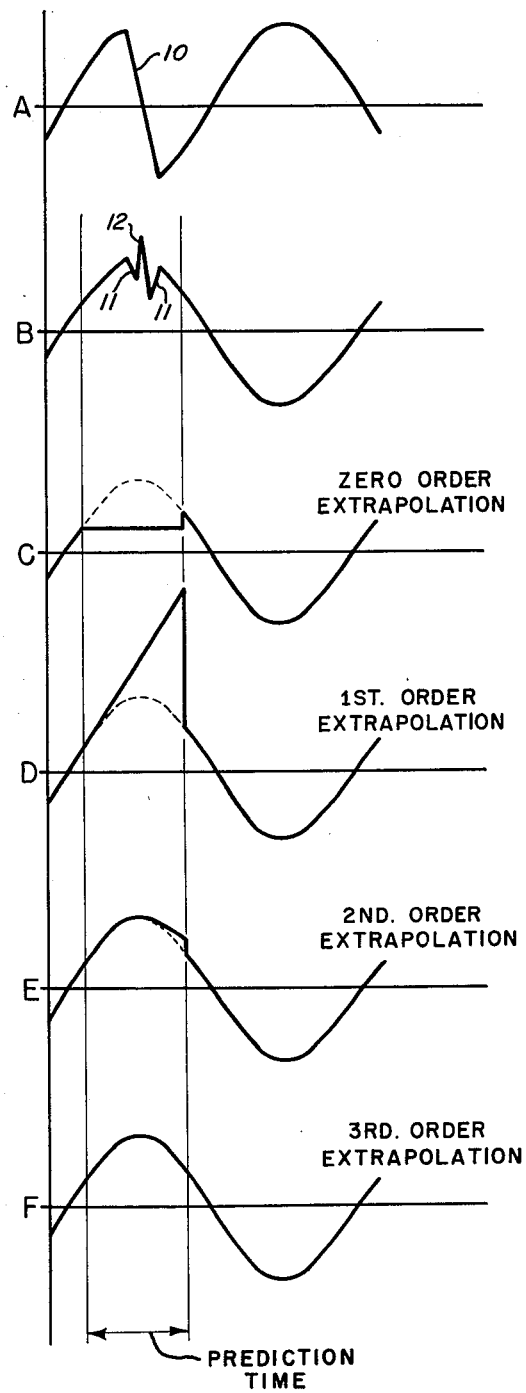
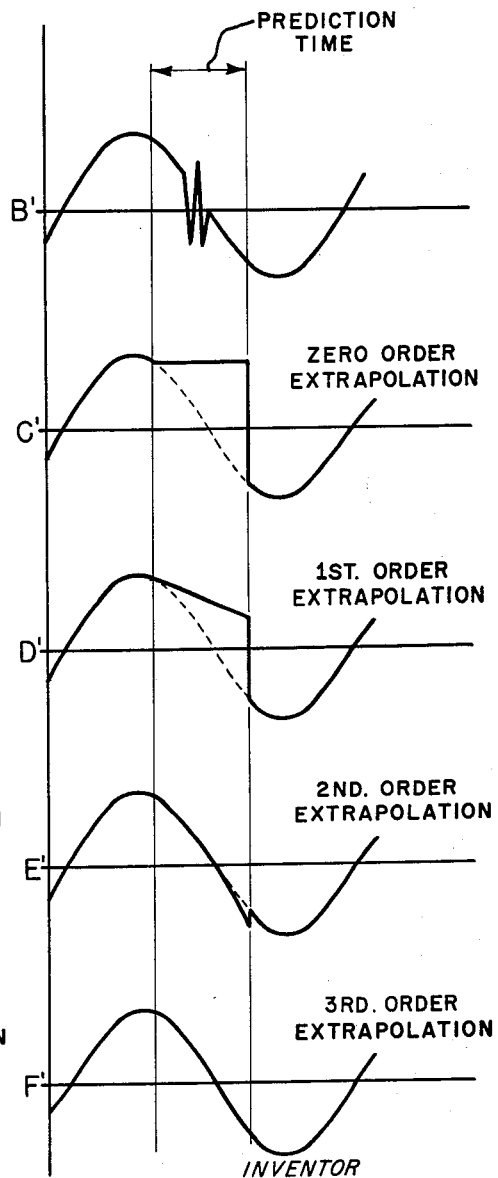
INVENTOR
Jean G. V. Isabeau
BY Francis W. Crotty
ATTORNEY INVENTOR
Jean G.V. Isabeau
BY Francis W. Crotty
ATTORNEY

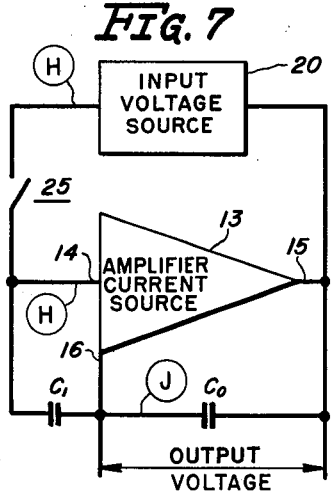
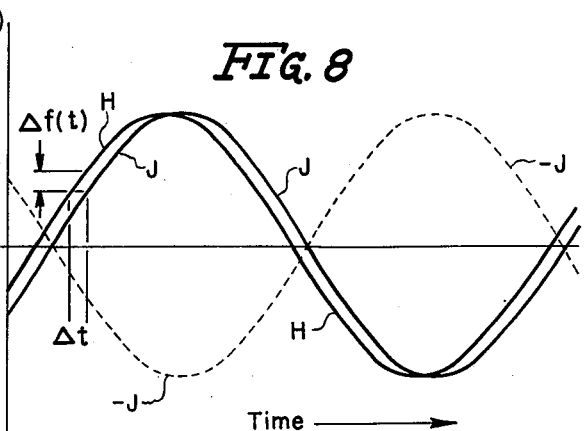
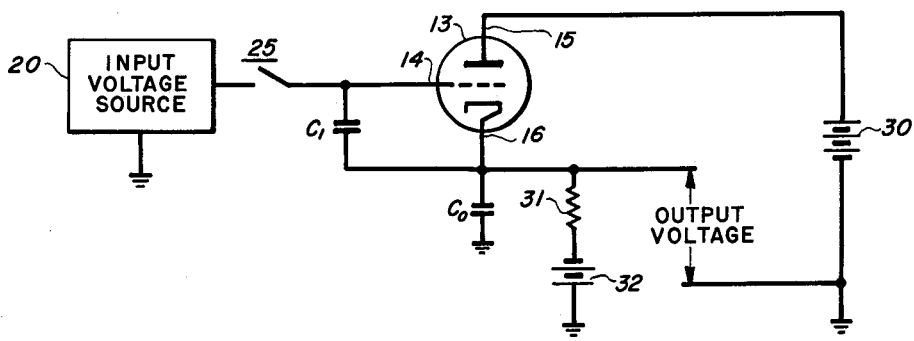
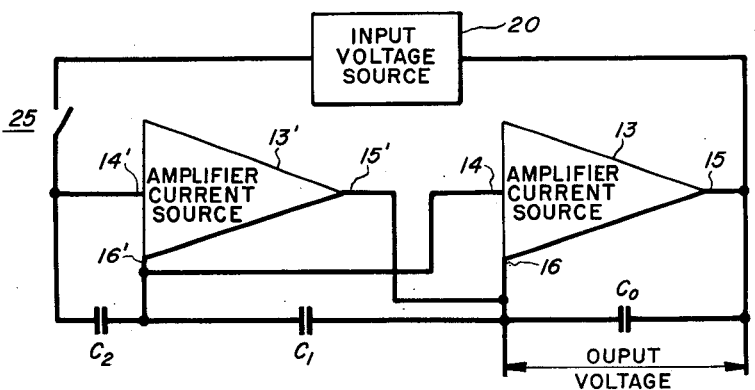

Jan. 28, 1964   J. G. V. ISABEAU   3,119,930
EXTRAPOLATOR AND A METHOD OF EXTRAPOLATING
Filed Nov. 3, 1958   7 Sheets-Sheet 4

FIG. 11

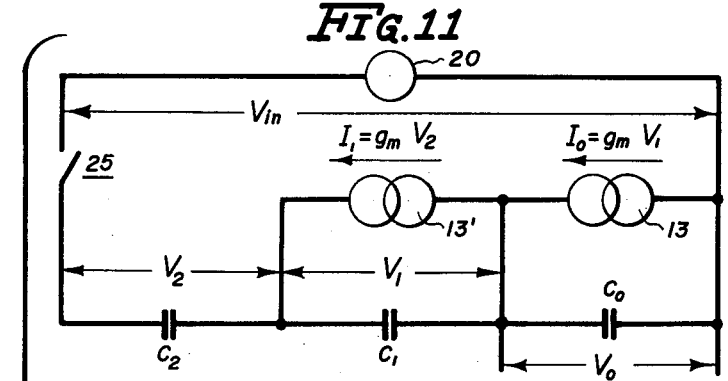

(1) $\quad V_o = \int \dfrac{I_o \, dt}{C_o}$ (2) or $\quad V_o = \int \dfrac{g_m V_l}{C_o} \, dt$ (3) or $\quad V_l = \dfrac{dV_o}{dt} \cdot \dfrac{C_o}{g_m}$ $V_l$ may be made $\ll V_o$ (4) $\quad V_2 = \dfrac{dV_l}{dt} \cdot \dfrac{C_l}{g_m}$ $V_2$ may be made $\ll V_l$ (5) $\quad \therefore V_{in} = V_o + V_l + V_2 \approx V_o$

FIG. 12

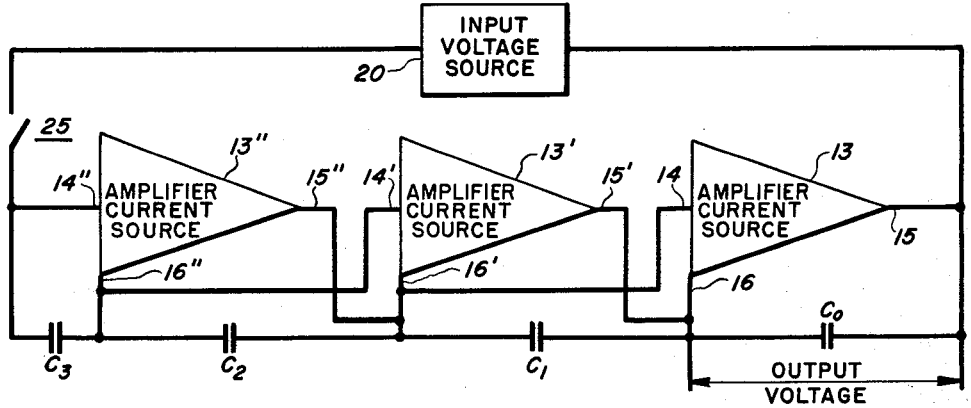

INVENTOR
Jean G. V. Isabeau
BY Francis W. Crotty
ATTORNEY

INVENTOR
Jean G.V. Isabeau
BY Francis W. Crotty
ATTORNEY

INVENTOR
Jean G. V. Isabeau
BY Francis W. Crotty
ATTORNEY

Jan. 28, 1964 J. G. V. ISABEAU 3,119,930
EXTRAPOLATOR AND A METHOD OF EXTRAPOLATING
Filed Nov. 3, 1958 7 Sheets-Sheet 7

INVENTOR
Jean G. V. Isabeau
BY Francis W. Crotty
ATTORNEY

United States Patent Office 3,119,930
Patented Jan. 28, 1964

3,119,930
EXTRAPOLATOR AND A METHOD OF
EXTRAPOLATING
Jean G. V. Isabeau, Lombard, Ill., assignor to Zenith
Radio Corporation, a corporation of Delaware
Filed Nov. 3, 1958, Ser. No. 771,377
19 Claims. (Cl. 235—183)

This invention pertains to an extrapolator, or what is sometimes known as a predictor, for determining from the wave shape of a signal during an initial time interval the wave shape of that signal throughout a succeeding time interval. The invention also relates to a novel method of extrapolating.

Extrapolators are employed in many different environments in order to achieve prediction, namely to calculate or compute values of a function lying beyond a portion of the function from values within that portion. For example, the present invention finds application in a secrecy communication system to prevent transient distortion attributable to transmission band width limitations and to the decoding operation. More specifically, when an intelligence signal, such as an audio signal, is coded or scrambled by varying one of its characteristics, for example its phase, from time to time during mode changing intervals in accordance with a secret code schedule, there may result from such a coding process distortion chargeable to the limited band width allotted to audio transmission which prevents the translation of the entire range of frequency components representing the sharp amplitude excursions of the coded audio signal produced by the phase inversions in the coding operation. A very large frequency band width would be required to convey all the signal components necessary to duplicate such abrupt amplitude changes. Consequently, it is difficult in effecting compensating phase inversions in the decoding process at the receiver to avoid some transient distortion. Moreover, the compensating phase changes effected in the decoding apparatus at the receiver do not always occur in exact time coincidence with the corresponding phase changes occasioned at the transmitter. Hence, additional undesirable transient pulses may be generated and are also reflected as transient distortion in the decoded audio signal.

Such transient distortion, of course, detracts from the fidelity or quality of reproduction of the decoded intelligence signal but since the distortion occurs essentially at the mode-changing instants (specifically, at moments of phase inversion for the assumed case) which instants are known, it may be effectively removed by an extrapolator. The extrapolator examines the decoded signal immediately prior to each mode-changing interval and predicts therefrom the desired shape of the signal during the mode-changing interval. In this way, the undesired distortion components may be deleted and replaced by the predicted or extrapolated wave from. The present invention is directed to a novel extrapolator circuit which may be incorporated in a subscription television system or in any other environment where extrapolation is desired.

It is, accordingly, an object of the present invention to provide an improved extrapolator for determining from the wave shape of a signal during a reference time interval the wave shape of that signal throughout a succeeding time interval.

It is another object of the invention to provide an improved secrecy communication system wherein there is produced a decoded intelligence signal substantially free of transient distortion.

It is a further object of the present invention to provide a novel method of extrapolating.

An extrapolator, constructed in accordance with one aspect of the present invention, comprises a source of a varying input signal and an output load for developing an output signal. Means, including a signal-translating device, are provided for coupling the source to the load and for also comparing the input and output signals to derive a control effect representing at any given instant the rate at which the output signal is changing with respect to time. Means are provided for applying the control effect to the signal-translating device to cause the wave shape of the output signal to simulate that of the input signal. Finally, the extrapolator includes means for effectively interrupting the coupling means subsequent to a reference time interval while maintaining the signal-translating device under the control of the control effect derived immediately prior to the interruption.

The method of extrapolating, in accordance with another aspect of the invention, contemplates determining from the wave shape of a varying input signal during a reference time interval the wave shape of that signal throughout a succeeding time interval. One step of the method resides in developing an output signal which is essentially a replica of the input signal but is phase displaced with respect thereto, and in another step the input and output signals are compared to derive a control effect representing at any given instant the rate at which the output signal is changing with respect to time. That control effect is utilized to control the wave shape of the output signal. Additionally, in accordance with the invention, the input signal is interrupted subsequent to the reference time interval while maintaining the wave shape of the output signal under the control of the control effect which has been derived immediately prior to the interruption.

The features of this invention which are believed to be new are set forth with particularity in the appended claims. The invention, together with further objects and advantages thereof, may best be understood, however, by reference to the following description in conjunction with the accompanying drawings, in which like reference numeral or letter indicia represent identical elements, and in which:

FIGURES 1 and 2 comprise wave forms helpful in explaining the operation of various different extrapolators, subsequently described, constructed in accordance with the invention;

FIGURE 7 is a schematic representation of another first order extrapolator constructed in accordance with the invention;

FIGURE 8 shows certain wave forms pertinent to the extrapolators of FIGURES 5–7 and helpful in explaining their operation;

FIGURE 9 shows a more detailed circuit diagram of one form of the device illustrated in FIGURE 7;

FIGURE 10 illustrates schematically a second order extrapolator constructed in accordance with another embodiment of the invention;

FIGURE 11 depicts the schematic of FIGURE 10 in idealized form from a different aspect and also includes a mathematical analysis of the extrapolator of FIGURE 10;

FIGURE 12 is a schematic representation of a third order extrapolator constructed in accordance with a further embodiment of the invention;

Figure 3:
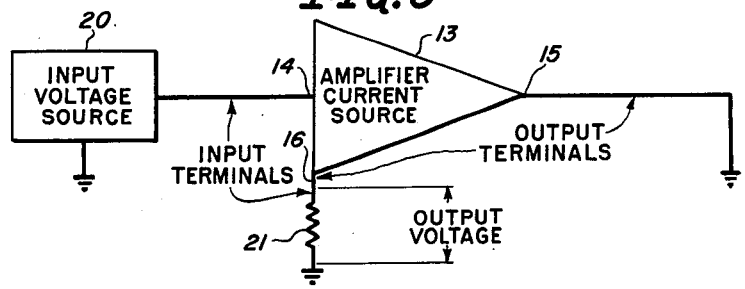
FIGURE 3 is a schematic representation of a conventional cathode or emitter follower and is useful in achieving a full understanding of the present invention.

Before considering specific embodiments of the invention, it is expedient to describe the results achieved by the different orders of extrapolation. For that purpose, attention is directed to the waveforms of FIGURE 1. As previously mentioned, one method of audio coding or scrambling involves phase inverting the audio signal at selected times or mode-changing intervals at the transmitter and introducing compensating phase inversions in the receiver. A system of this type is illustrated in Patent 2,852,598, issued September 16, 1958, in the name of Erwin M. Roschke, and assigned to the present assignee. The audio phase inversion process of the Roschke system is subject to the introduction of some transient distortion since, firstly, the mode changes (phase inversions) may not occur in exact synchronism at the transmitter and receiver, and secondly, the limited band width of commercial transmission links precludes the precise reproduction of the extremely sharp phase inversions.

Curve A in FIGURE 1 illustrates a coded intelligence or audio signal. The signal is depicted for convenience as primarily a sinusoidal wave characterized by a phase inversion 10 occurring during a mode-changing interval established by the audio coding arrangement at a transmitter, such as the one shown in the Roschke Patent 2,852,598. Because of transmission band width limitations, the phase inversions of the coded audio generally do not occur instantaneously but, instead, take place over a finite time interval and, therefore, are manifest in the signal waveform with a finite slope as shown by the slanting rather than strictly vertical configuration of the waveform at that time. As mentioned hereinbefore, even if the phase inversions occur instantaneously at the transmitter, it would require the transmission of an extraordinarily wide frequency band width to transmit all the frequency components necessary to represent such abrupt phase inversions and this is not practicable.

In the Roschke system, Patent 2,852,598, the coded audio signal of curve A is subjected to a compensating phase inversion so that a decoded audio signal like that shown in curve B of FIGURE 1 is produced. There is a "spike," "wedge" or "pie cut" 11 in the decoded sinusoidal signal at the single mode-changing interval illustrated due to the prolonged rather than instantaneous phase change in the coded audio signal of curve A.

Additionally, switching transients like that designated 12 may be introduced in the decoding process. For convenience, transient pulse 12 is drawn on a reduced scale in the illustrated diagram; it will be appreciated that this pulse may actually be many times greater in amplitude than the audio signal.

It is apparent that the distortion of the sinusoidal signal of curve B, if not eliminated, detracts from the listening quality of the decoded intelligence. It may be effectively eliminated quite conveniently by means of zero order extrapolation such as is achieved with apparatus described and claimed in copending application Serial No. 600,196, filed July 26, 1956, and issued June 9, 1959, as Patent 2,890,269, in the name of Walter S. Druz, and assigned to the present assignee. There a series of gating pulses are developed each of which embraces and anticipates an assigned mode-changing interval, namely an assigned phase inversion, of the decoded audio. These pulses are then used to operate a gate interposed in the audio channel to effectively delete those portions of the decoded audio occurring during the mode-changing intervals. The gate or sampler is of the type that establishes a voltage on a condenser equal to the instantaneous value of the decoded audio, and when the gate is closed the condenser maintains the voltage assumed just prior to its closing. When the gate is once again opened, the decoded audio is transmitted to the condenser so that it once again assumes a voltage representative of the instantaneous magnitude of the audio signal.

Curve C in FIGURE 1 illustrates in full line construction the shape of the signal of curve B assuming it has been subjected to zero order extrapolation of the type realized in the Druz system, Serial No. 600,196, now Patent No. 2,890,269. The interval during which extrapolation takes place is designated the "prediction time" interval. The prediction interval, of course, is short with respect to the period of the intelligence signal but is long compared to the interval containing distortion components 11 and 12 in order that such distortion may be deleted.

In achieving zero order extrapolation the amplitude of the signal is fixed, during the prediction interval, at the value assumed just prior to the prediction interval. Since the slope of the signal of curve C is zero during the prediction interval, the operation is called zero order extrapolation. The desired, idealized sinusoidal shape is illustrated in curve C, as well as in others to be discussed, in broken or dashed line construction.

The discontinuity, namely the zero slope portion, of the decoded audio signal of curve C is effectively "smoothed out" in the Druz system by means of an appropriate filter which produces an output signal relatively free of audible distortion.

By way of contrast, first order prediction of the signal of curve B consists of determining the first derivative (time rate of change) or slope of that waveform just prior to the prediction time and maintaining it constant throughout the prediction interval. The resulting waveform is that shown by the full-line construction in curve D.

Improved results may be obtained with second order extrapolation which comprises developing the second derivative in addition to the first derivative of the signal of curve B prior to the prediction time. If the waveform of the signal of curve B is determined throughout the prediction interval in accordance with both derivatives, the signal of curve E results and this is obviously a much closer simulation or approximation of the desired sinusoidal shape which is shown in dashed line construction. There is only a very slight discontinuity in the latter part of the prediction interval and even this may be minimized by means of a third order extrapolating function in which the predicted waveform is placed under the additional control of the third derivative of the signal of curve B just prior to the prediction time. The waveform of curve F, which is essentially a perfect sine wave, results from third order extrapolation.

In other words, during the prediction time interval the signal being operated upon is replaced by a function corresponding to a certain number of terms of its Taylor expansion, namely:

$$f(t) = f(t_0) + (t-t_0)\left(\frac{df}{dt}\right)_{t=t_0} + \frac{(t-t_0)^2}{2!}\left(\frac{d^2f}{dt^2}\right)_{t=t_0} + \frac{(t-t_0)^3}{3!}\left(\frac{d^3f}{dt^3}\right)_{t=t_0} + \cdots$$

The curves of FIGURE 2 are designated B'—F' and correspond to waveforms B—F, respectively, in FIGURE 1 and illustrate the results achieved by means of the various orders of extrapolation when the distortion, attributable to mode changing, occurs at a different point in the sine wave cycle. For example, while first order extrapolation results in distortion when the prediction time commences during the rising portion or phase of the sine wave cycle and terminates on the falling portion, as is the case illustrated by curve D in FIGURE 1, the distortion or error is not so pronounced when the prediction time occurs during a portion of the sine wave which is always changing in the same direction, as shown by curve D' in FIGURE 2. As the order of extrapolation increases, the error for some phases of the prediction time commencement may become larger, but the average error decreases when all possible phases are considered.

The present invention is calculated to achieve first, second and/or third or, for that matter, any number order of extrapolation by means of relatively simple circuitry.

In the interest of providing a full understanding of the invention, consideration is first given to a discussion of the well-known cathode or emitter follower circuit represented in FIGURE 3. An amplifier current source or signal-translating device 13 which may take the form of a vacuum tube, a transistor or the like, has an input terminal 14, an output terminal 15 and a common input-output terminal 16. For example, if current source 13 is a triode, terminal 14 connects to its control grid, terminal 16 to its cathode and terminal 15 to its plate or anode. An input voltage source 20 is coupled between input terminal 14 and a plane of reference potential, such as ground. Terminal 16 is coupled to ground through an output load resistor 21 and terminal 15 is coupled directly to ground. It will be noted that the operating potential sources have been omitted from the diagram since it is only a functional representation.

In a conventional cathode or emitter follower the output voltage is developed across load resistor 21 and this voltage is effectively compared or subtracted from the input voltage of source 20. The difference is developed between input terminals 14 and 16. Since the voltage across load 21 is of the same polarity as the input voltage, the difference appears between terminals 14 and 16 without requiring a separate element or network to achieve such a computation.

If the input voltage of source 20 is constant, the differential between that and the output voltage is sufficient to maintain constant current flow through, with a consequent fixed voltage drop across, load 21. The output voltage on load 21 can be made practically equal to the input voltage if amplifier 13 is of the type requiring a negligible input between terminals 14 and 16. When the voltage from source 20 varies, the differential between it and the output voltage changes and this differential is impressed between input terminals 14 and 16 in order to change the current flow through load 21 accordingly. Consequently, the output voltage follows the input voltage with respect to polarity or phase, and magnitude, neglecting the potential between terminals 14 and 16.

For reasons which will be appreciated later, it is appropriate to consider rather briefly the apparent impedance shunting load 21 and also that shunting input terminals 14 and 16 in FIGURE 3. It is well known, and can be demonstrated mathematically, that in any amplifier having degenerative voltage feedback the internal output impedance (namely, that presented looking back into the output circuit of the amplifier) is relatively low. This inherent characteristic stems from the fact that negative or degenerative feedback tends to maintain the output voltage constant independently of the load condition.

Assume that the degenerative feedback in the circuit of FIGURE 3 is removed by opening the connection between source 20 and terminal 14. Assume also that an output voltage variation of one sense (namely, increasing or decreasing) and of a predetermined amplitude is derived between terminal 16 and ground through the action of some perturbation. When degeneration is re-established, a feedback voltage of the opposite sense causes an immediate change of the potential difference between terminals 14 and 16 in the opposite sense, resulting in a variation of current flow through load 21 in the opposite sense. This, in turn, causes a decrease in the amplitude of the output voltage variation from that present in the absence of feedback. In other words, if the output voltage variation is in a positive sense (namely, increasing), a negative feedback voltage is produced which decreases the potential difference between terminals 14 and 16 with a resultant decrease in current flow through load 21 such that the magnitude of the output voltage variation is reduced. In effect, this means that the cathode follower is characterized by having a low output impedance and, considered as a driver for a succeeding signal-translating stage, it is a low-impedance source.

Similarly, the impedance between terminals 14 and 16 is relatively low because they are effectively shunted by load 21 in series with voltage source 20. It has just been shown that load 21 has a low apparent impedance and a voltage source, by definition, has such a small output impedance that it may be ignored.

Viewed differently, the impedance at any point of a circuit may be defined as the ratio of a cause to an effect, the cause being an externally impressed potential or voltage variation and the effect being the current variation produced thereby through the circuit at that point. If, for example, the output voltage in the circuit of FIGURE 3 is made to vary in one sense, the potential difference between terminals 14 and 16 changes accordingly in the opposite sense and this results in a change in current flow through source 13 to effect automatic compensation or cancellation for the voltage change between terminal 16 and ground. The cause, namely the variation in the output voltage, is small with respect to the effect or variation in current produced through load resistor 21 and thus the ratio of cause to effect is relatively small indicating that the effective output impedance in the presence of feedback is relatively low. Analogous reasoning may be applied to demonstrate that the impedance between terminals 14 and 16 is also low in the presence of feed-back.

Figure 4:
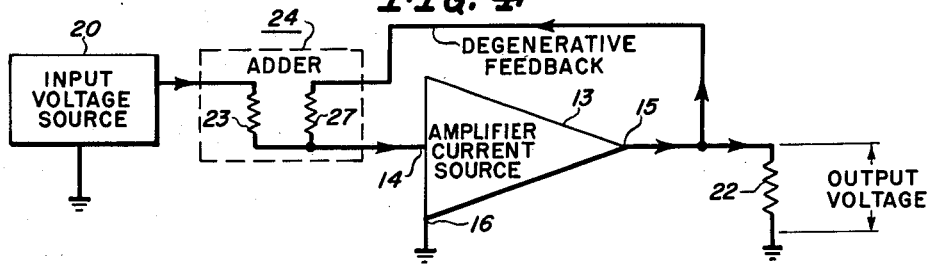
FIGURE 4 illustrates a conventional degenerative amplifier and is also helpful in facilitating a complete understanding of the inventive concept.

By way of additional background material to assist in facilitating a thorough understanding of the inventive concept, it is expedient to also consider the operation of a conventional degenerative amplifier of the type shown in FIGURE 4. As in the case of the schematic of FIGURE 3, the operating potential sources have not been shown in FIGURE 4. In fact, in many of the schematics to be discussed the operating potential sources have also been deleted since only the A.C. circuits are of interest.

In FIGURE 4, the ungrounded terminal of input voltage source 20 is coupled through a resistor 23, which constitutes a portion of an adder 24, to input terminal 14 of amplifier current source 13. Common input-output terminal 16 is coupled to ground and output terminal 15 is coupled through a load, shown as a resistor 22, to ground. The output voltage is developed across resistor 22 and, becasue of the 180° phase reversal introduced by amplifier 13, is of a polarity opposite that of the input voltage from source 20. Output terminal 15 is also coupled back through a resistor 27, which is a further part of adder 24, to input terminal 14 to provide a conventional degenerative feedback circuit.

The basic difference between the cathode or emitter follower illustrated in FIGURE 3, which is actually one form of a degenerative amplifier, and the degenerative amplifier of FIGURE 4 is that in FIGURE 3 the output voltage is of the same polarity as the input voltage to which it is compared, whereas in FIGURE 4 the comparison effected is between signals of opposite polarity. Because of the polarity difference it is necessary to employ adder 24 which effectively accomplishes an algebraic addition (actually a subtraction when the signals are of opposite polarity) between the input and output voltages; a potential proportional to the result appears at the junction of resistors 23 and 27. The relative values of resistors 23 and 27 determine the ratio of the output voltage and input voltage which will render the voltage at terminal 14 equal to zero. For example, if resistors 23 and 27 are equal and the input and output voltages are, for example, +4 volts and −4 volts, the potential at the junction, and consequently at terminal 14, is zero volts. As in the case of the cathode or emitter follower, by subtracting the output from the input voltage, the circuit of FIGURE 4 tends to maintain the voltage applied between terminals 14 and 16 relatively small compared to the input voltage from source 20. If the input voltage is constant the output voltage is likewise constant, whereas if the input potential varies the output voltage follows the variations at exactly 180° out of phase, due to the absence of reactive elements in FIGURE 4.

As is the case with the circuit of FIGURE 3, and in fact as is characteristic of all degenerative amplifiers, the apparent impedance between terminals 14 and 16 and that across the output are relatively low. Without feedback, output voltage changes in the circuit of FIGURE 4 may be impressed without being strongly opposed by current flow. Assume that the feedback circuit is disconnected, and that an output voltage variation of a certain amplitude is established across load 22. With the introduction of feedback, a voltage is fed back to terminal 14 which is effective to vary the current flow through amplifier 13 and consequently load 22 such that the amplitude of the output voltage variation is opposed. Once again, this indicates that the output impedance is low.

Due to degeneration, the apparent impedance between input terminal 14 and ground in FIGURE 4 is also considerably lower than that present without feedback. Assume that the feedback circuit is disconnected and that a voltage change of a fixed magnitude is applied between terminals 14 and 16. For this condition, no partial cancellation ensues with respect to the voltage applied to terminal 14. When the feedback circuit is connected back into the amplifier, the current flowing through resistor 27 is in a direction such as to oppose the impressed voltage variation. The low apparent impedance of terminal 14 to ground may be accounted for by a decrease in the effective impedance shunting terminals 14 and 16 when degeneration is added to the amplifier.

Figure 5:
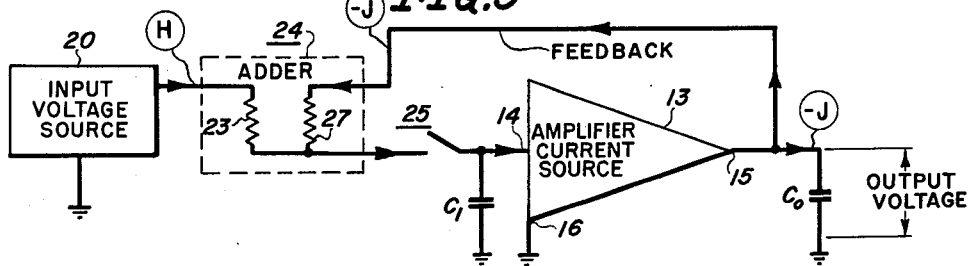
FIGURE 5 is a functional or logical diagram of a first order extrapolator constructed in accordance with one embodiment of the invention.

Turning now to FIGURE 5 which illustrates the basic invention concept as embodied in a first order extrapolator, it will be seen that the degenerative amplifier analogy is appropriate as background material. In FIGURE 5, the ungrounded output of input voltage source 20 is coupled through resistor 23 and a series connected single-pole single-throw switch 25 to input terminal 14 of amplifier current source 13. A storage device, specifically a condenser $C_1$, is coupled between input terminal 14 and common input-output terminal 16 by way of ground. A reactive storage output load in the form of a condenser $C_0$ is coupled between output terminal 15 and common input-output terminal 16 and the voltage at the junction between terminal 15 and condenser $C_0$ is fedback through resistor 27 to the junction between resistor 23 and switch 25.

In operation, when switch 25 is closed the varying input signal from source 20 is translated without incident through current source 13 to output load $C_0$. The output potential is effectively compared with the input voltage from source 20 in adder 24 in precisely the same manner as in adder 24 of FIGURE 4 and the differential between those two voltages is impressed across condenser $C_1$ which, in turn, controls current source 13. As in the case of both the cathode follower, and the degenerative amplifier, if the input voltage is constant, the output voltage is steady and the differential of the two is fixed such that signal-translating device or current source 13 establishes a slight current flow primarily through resistor 27 to maintain that condition. If the input voltage varies, the differential potential developed by adder 24 also varies, resulting in appropriate current flow through, and consequently charge established in output condenser $C_0$. Thus, the voltage across condenser $C_0$ follows that developed by source 20 but is of opposite polarity and slightly delayed with respect thereto because of the reactive nature of condensers $C_0$ and $C_1$. In other words, the phase difference deviates slightly from 180°.

In order to allow for variations of the voltage developed across condenser $C_0$ to be of either polarity, it is necessary that the voltage (or charge) on condenser $C_0$ be bi-directionally controlled. In other words, with respect to condenser $C_0$ amplifier current source 13 must be bi-directional. To appreciate one way in which this may be accomplished, one form that the schematic arrangement of FIGURE 5 may take is shown in detail in FIGURE 6.

Current source 13 is a conventional triode with terminals 14—16 connected respectively to its control grid, anode and cathode. The cathode is connected to ground through the parallel combination 28 of a resistor and a condenser, this resistor-condenser network serving to establish a bias condition between the grid and cathode of tube 13. Interposed between output terminal 15 and resistor 27 in the feedback circuit is a D.C. blocking condenser 30 which functions to isolate the direct current component in the amplifier from the feedback circuit.

The plate or anode of triode 13 is coupled to the positive terminal of a source of unidirectional operating potential 32 through a relatively high resistance 31, the negative terminal of source 32 being coupled to ground. Units 31 and 32 together constitute a high impedance source of constant current and, in conjunction with network 28, serve to establish a class A working or operating point for triode 13. Consequently, resistor 31 and battery 32 would be included in the single triangularly shaped representation of course 13 in FIGURE 5. A substantially constant current flow through resistor 31 and battery 32 is insured by arranging the components in the output circuit of tube 13 such that the impedance of resistor 31 is high with respect to that of load condenser $C_0$ in parallel with the series combination of triode 13 and network 28. If the input signal swings terminal 14 in a positive direction with respect to common input-output terminal 16, current flow through triode 13 increases and, since the current flowing through resistor 31 is substantially constant, the increased current must flow through condenser $C_0$. On the other hand, if the voltage on the grid of triode 13 decreases, its plate current decreases and once again since resistor 31 always translates the same magnitude of current, the difference must be made up by a flow of current from condenser $C_0$ through resistor 31 and battery 32. Thus, condenser $C_0$ is effectively provided with two parallel shunting circuits, one of which is used when the condenser is charging up while the other is employed while the condenser is discharging.

Figure 6:
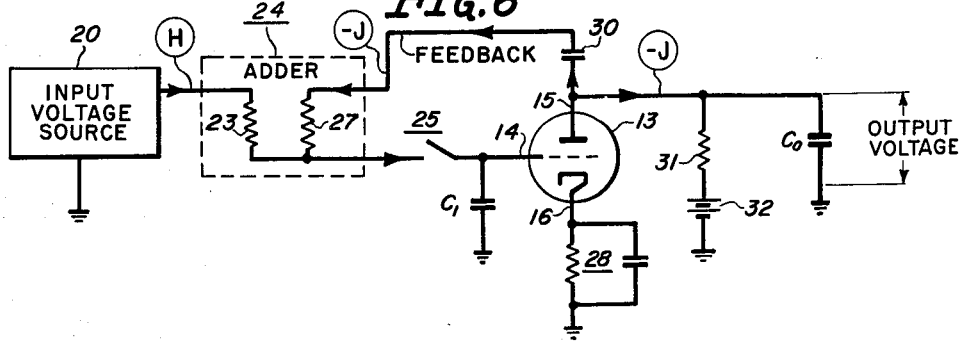
FIGURE 6 depicts a more detailed diagram of one form of the arrangement shown in FIGURE 5.

FIGURE 8 illustrates typical waveforms that may be found at different points in the diagrams of FIGURES 5 and 6. Assume that the sinusoidal signal of curve H is developed in source 20, as indicated by the letter designation in FIGURES 5 and 6. A replica of that signal (curve −J) is developed across reactive storage output load $C_0$ but is of opposite polarity with respect to the signal of curve H. The phase displacement varies slightly from exactly 180° because of the reactive components. To illustrate this fact, the 180° counterpart of the signal of curve −J has been shown in FIGURE 8, designated curve J. The variation or delay between curves H and J is thus apparent. Adder 24 and condenser $C_1$, assuming switch 25 is closed, develop a control effect, specifically a control voltage, representing at any given instant the difference between waveforms H and J. The magnitude of the differential voltage is, of course, dependent on the degree of phase displacement which in turn is determined by the electrical size of load condenser $C_0$ as well as a characteristic of source 13, specifically the $g_m$ or transconductance if current source 13 takes the form of a conventional triode.

Since curve H is a function of time and since condenser $C_1$ effectively assumes a charge representative of an incremental change $\Delta f(t)$ in amplitude during an incremental time interval $\Delta t$, which is equal to the phase difference between curves H and J, the potential on condenser $C_1$ is a measure of the first derivative of the output signal or the rate at which the output signal is changing with respect to time at that instant. Because of the very close similarity between curves H and J, the voltage on condenser $C_1$ may thus be considered as also representing the first derivative of the input signal of curve H.

Thus, adder 24 and reactive storage condenser $C_1$ cooperate to compare the input signal (curve H) and output signal (curve —J) to derive a control effect representing at any given instant the rate at which waveform J is changing with respect to time; in other words, the slope of curve J at any given instant.

If switch 25 is opened, source 20 is no longer coupled to load $C_0$ but since condenser $C_1$ is a memory device which has effectively recorded the first derivative of the output signal just prior to the opening of the switch, device 13 is operated subsequent to the switch opening instant to cause condenser $C_0$ to either charge or discharge linearly as determined by the control effect on condenser $C_1$. If the signal of curve B of FIGURE 1 is developed in source 20 of FIGURES 5 and 6 and if switch 25 is closed except during the prediction time interval, the waveform of curve D is developed across condenser $C_0$. On the other hand, if the signal of curve B' of FIGURE 2 is developed in source 20 and if switch 25 is opened during the prediction time interval, wave form D' results across condenser $C_0$.

As is the case with the degenerative amplifier of FIGURE 4, amplifier 13 in the extrapolators of FIGURES 5 and 6 has both a low impedance between terminals 14 and 16 and a low output impedance while switch 25 is closed and the degenerative feedback circuit is operative. This is necessary in order that both condensers $C_1$ and $C_0$ may have sufficiently short time constants so that they are able to follow the wareform variations of the input signal from source 20. The time constants must be commensurate with the frequency range of the input signal. However, since it is usually preferable in first order extrapolators like that of FIGURE 5 or FIGURE 6 to continue during the prediction time the waveform that is being extrapolated in accordance with the slope or tangent at the start of the prediction time interval, it is desirable that the other circuit elements shunting both condensers $C_1$ and $C_0$ during the prediction interval have relatively high impedances. Thus, it is desirable that during the time that switch 25 is opened amplifier current source 13 have both a high impedance between terminals 14 and 16 and a high output impedance. In this way, both the input and output circuits of amplifier 13 will have time constants long relative to the prediction time interval. It will be recalled that condensers $C_1$ and $C_0$ memorize two different informations, $C_1$ memorizing the slope or first derivative of the output voltage at the start of the prediction time interval while condenser $C_0$ memorizes the instantaneous value of the output voltage at the beginning of the prediction interval. If those two condensers are not provided with high shunting impedances during the prediction time, the charges thereon will leak off and possibly undesired curvature of the output voltage may be introduced.

Long time constants for both the input and output circuits of amplifier 13 are insured merely by removing the degenerative feedback since, as discussed previously in connection with FIGURE 4, it is the feedback that gives rise to the relatively low impedances of the input and output circuits. Of course, the feedback circuit in FIGURES 5 and 6 is rendered ineffective by opening switch 25. During the prediction time, therefore, condenser $C_1$ is shunted only by the impedance of the tube between input terminals 14 and 16 which is relatively high, assuming there is no grid current. Condenser $C_0$ during that same interval is shunted by two parallel paths, one containing the impedance between terminal 15 and ground which will be high, and the other containing resistors 23 and 27 and the output impedance of source 20 all in series. The impedance of source 20 is negligible but the total resistance of resistors 23 and 27 may be made relatively high.

The circuits of FIGURES 5 and 6 include a separate adder 24 in addition to condenser $C_1$ but the condenser may serve the dual function of comparing the input and output signals while at the same time memorizing the control effect representing the first derivative of the output signal. This is achieved by means of the circuit of FIGURE 7, wherein input voltage source 20 is coupled between input terminal 14 and output terminal 15 of signal-translating device 13, switch 25 being interposed between source 20 and terminal 14. Output load $C_0$ is coupled between common input-output terminal 16 and output terminal 15 and condenser $C_1$ is coupled between common input-output terminal 16 and input terminal 14. It should be apparent that the arrangement of FIGURE 7 bears a relationship to the cathode or emitter follower of FIGURE 3. Terminal 15 may be established at ground and condenser $C_0$ may be analogized to resistor 21. The input and output voltages are of the same polarity.

The output voltage across condenser $C_0$ in FIGURE 7 is subtracted from the varying input voltage from source 20, when switch 25 is closed, and the difference is developed across condenser $C_1$ which controls current source 13 in the same manner as in the circuits of FIGURES 5 and 6. Since the voltage across condenser $C_1$ is very small compared to that across condenser $C_0$, the output voltage may also be taken across the series combination of condensers $C_1$ and $C_0$.

When switch 25 is opened condenser $C_1$, which has memorized a control effect or voltage representing the rate at which the output signal across condenser $C_0$ is changing with respect to time just prior to the interruption of switch 25, controls current source 13 so that the charge of condenser $C_0$ varies linearly under the control of that control effect and signals of the type shown in curve D and D' are developed across condenser $C_0$.

The curves of FIGURE 8 are also applicable to the circuit of FIGURE 7. As in the case of FIGURE 5 or 6, the signal of curve H represents that produced by source 20. However, unlike FIGURE 5 or 6 due to the identity of polarity of the input and output voltages, curve J is representative of the signal developed across condenser $C_0$ in FIGURE 7.

A practical circuit for the first order predictor represented in FIGURE 7 is shown in FIGURE 9. As in FIGURE 6, current source 13 is a conventional triode with terminals 14—16 being connected, respectively, to its control grid, anode and cathode. One output terminal of source 20 is coupled through switch 25 to the control grid and the other output terminal is coupled to ground. Condenser $C_1$ is connected between the grid and cathode and the cathode is coupled to ground through condenser $C_0$. The plate or anode is coupled to the positive terminal of a source of unidirectional operating potential 30, the negative terminal of which is coupled to ground. In order to establish a Class A working or operating point for triode 13, the cathode is connected through relatively high resistance 31 to the negative terminal of a unidirectional potential 32 having a positive terminal connected to ground. Units 31 and 32 are the counterparts of the identically numbered units in FIGURE 6 and likewise serve as a high impedance source of constant direct current. A comparison of FIGURES 9 and 7 reveals that if the sources of operating potential 30 and 32 and resistor 31 are eliminated, the circuits are essentially similar.

The cathode follower analogy is readily apparent in the circuit of FIGURE 9 inasmuch as, when switch 25 is closed, the varying input voltage from source 20 is compared with the output voltage across condenser $C_0$, and a difference potential is established across condenser $C_1$ which is effective to control the flow of current in triode 13 in accordance with the differential or first derivative of the output signal.

As in the circuit of FIGURE 6, condenser $C_0$ in FIGURE 9 is bidirectionally controlled. A substantially constant magnitude of current flows through units 31 and 32 and at least a portion of this current may or may not flow from condenser $C_0$ depending on the potential on condenser $C_1$. More specifically, assume that the voltage across condenser $C_1$ becomes more positive so that there is a greater potential difference between the grid and cathode of triode 13. The flow of electrons through the tube is increased and since resistor 31 and battery 32 will already be translating a constant magnitude, the increased portion of the electron flow through tube 13 is made up of electrons leaving the top terminal of condenser $C_0$, namely the ungrounded terminal. Condenser $C_0$ thus charges up to a higher potential. Conversely, if the potential across condenser $C_1$ becomes more negative the potential between the grid and cathode decreases causing less electron flow through triode 13 and resistor 31. Since units 31 and 32 must translate a constant current, the deficiency must be made up by a flow of electrons through resistor 31 to the top terminal of condenser $C_0$. The condenser therefore discharges and the potential on terminal 16 decreases.

In short, condenser $C_0$ loses electrons (charges up to a higher potential) through tube 13 and gains electrons (discharges to a lower potential) from resistor 31 and battery 32.

It is necessary that the input and output circuits of triode 13 provide low apparent shunting impedances both before and after each prediction time interval to insure that condensers $C_1$ and $C_0$ follow the waveform variations of the input signal from source 20. It is also necessary that they provide high shunting impedances during each prediction time interval so that undesired curvature is not introduced in the linearly changing voltage on condenser $C_0$. When switch 25 is closed, low shunting impedances are provided in the same manner as explained in connection with the degenerative amplifier of FIGURE 3. Briefly, the degenerative feedback causes condenser $C_0$ to have a low apparent impedance and for the same condition, with switch 25 closed, condenser $C_1$ charges and discharges through condenser $C_0$ and source 20 in series both represent low impedance. Thus, at all times that the switch is closed, the desired impedance relations are established. However, during the prediction time interval when switch 25 is opened, condenser $C_1$ is provided with a high shunting impedance since it is only shunted by terminals 14 and 16, the impedance therebetween being relatively high assuming that no grid current is present. At the same time, condenser $C_0$ is insured of a high shunting impedance since there is essentially across it only the internal plate resistance between the cathode and plate of tube 13. The value of condenser $C_0$ is chosen large enough so as to make the effect of the internal plate resistance of the tube negligible during the predictor time interval.

While first order predictors like those shown in FIGURES 5, 6, 7 and 9 achieve extremely worthwhile results in that a wave form may be continued during a prediction time interval at the same slope as preceded that interval, second, third and even higher orders of extrapolation may be realized by essentially cascading the circuit of FIGURE 7 so that predictions of the type shown in curves E, E', F and F' are obtained. FIGURE 10 represents a second order extrapolator wherein input source 20 is coupled through switch 25 to a series circuit containing not only condensers $C_0$ and $C_1$ but additionally a condenser $C_2$. As in the case of FIGURE 7, condenser $C_1$ is coupled between input terminals 14 and 16 of current source 13 and condenser $C_0$ is coupled between terminals 16 and 15. Additionally, condenser $C_1$ is coupled between the common input-output terminal 16' and the output terminal 15' of another amplifier current source 13'. Condenser $C_2$ is coupled between terminal 16' and input terminal 14' of source 13'.

Since current source 13 and condensers $C_1$ and $C_0$ are coupled in the same manner as in FIGURE 7, the voltage across condenser $C_1$ is a measure of the derivative of the output voltage across condenser $C_0$. Since the output voltage is substantially the same as the input voltage, except during the time switch 25 is open, the voltage across condenser $C_1$ is also essentially a measure of the first derivative of the input voltage. It will be noted that current source 13' is coupled to condensers $C_1$ and $C_2$ in the same manner and thus the voltage developed across $C_2$ is proportional to the derivative of the voltage across condenser $C_1$.

Assume that switch 25 is closed and the transconductances of sources 13' and 13 are relatively high so that the voltage across condenser $C_1$ is negligible compared to that on condenser $C_0$, and the voltage on condenser $C_2$ is negligible with respect to that on condenser $C_1$. The voltage across condenser $C_1$ is then essentially a measure of the differential between that across condenser $C_0$ and the input voltage and thus current source 13 is operated in accordance with the first derivative of the input voltage.

Similarly, the voltage on condenser $C_2$ is representative of the first derivative of the voltage across condenser $C_1$ and since the latter voltage is actually the first derivative of the output voltage, the voltage across condenser $C_2$ is the second derivative of the output voltage. Condenser $C_1$ thus effectively determines the time rate of change or slope of the output signal at any given instant while condenser $C_2$ develops a potential proportional to the rate at which the slope is varying with respect to time at the same given instant.

When switch 25 is opened, condenser $C_2$ maintains a fixed charge to control the charge condition of condenser $C_1$ linearly. The control effect developed across condenser $C_1$ from the comparison between the input and output signals (namely the first derivative determination) is thus further varied by the action of condenser $C_2$. Condenser $C_0$ is thus either charged or discharged non-linearly under the control effect developed across condenser $C_1$ and also that developed across condenser $C_2$ to achieve second order extrapolation such as represented by curves E and E' in FIGURES 1 and 2, respectively.

To explain further, at the beginning of a prediction time interval each of condensers $C_2$ and $C_1$ has recorded a fixed charge or control effect. The electron flow to and from condenser $C_1$ being under the control of condenser $C_2$ proceeds at a constant rate throughout the entire interval to cause the charge condition or voltage established on condenser $C_1$ to vary linearly. Because of the changing voltage on condenser $C_1$, the electron flow to and from condenser $C_0$ does not proceed at a fixed rate but instead varies to cause the charge condition or voltage established across condenser $C_0$ to change non-linearly. Thus curvature of the output voltage waveform is realized during the prediction time as shown in curves E and E'.

As is the case with the extrapolators of FIGURES 7 and 9, the condensers in the input and output circuits of each of amplifiers 13' and 13 in FIGURE 10 are provided with relatively short time constants when switch 25 is closed and long time constants when the switch is opened. With switch 25 closed, condenser $C_0$ has a low shunting impedance because of the degeneration introduced into the circuit of amplifier 13, and likewise condenser $C_1$ has a relatively low shunting impedance due to the degeneration in amplifier 13'. The impedance shunting condenser $C_2$ is low because it is made up of the series circuit including the impedance of condenser $C_1$ and the impedance of condenser $C_0$, each of which is low, and also the output impedance of source 20 which is negligible.

The circuit of FIGURE 10 has been redrawn in idealized form in FIGURE 11. A mathematical analysis is also included in FIGURE 11 depicting th operation of the circuit. Since the current flow $I_0$ produced by current source 13 is determined by the control effect or voltage across condenser $C_1$, its value is equal to the transconductance $g_m$ of source 13 multiplied by the voltage $V_1$ developed across condenser $C_1$. Similarly, since the current $I_1$ developed by source 13' is directly under the control of the voltage $V_2$ developed across condenser $C_2$, its value is equal to $g_m$ multiplied by $V_2$. It will be assumed that sources 13 and 13' have the same transconductance. The output voltage $V_0$ developed across condenser $C_0$ is determined by the integral of current $I_0$ divided by capacitance $C_0$, as shown by Equation 1. This may be rewritten as equation (2) by substituting $g_m V_1$ in place of $I_0$. Differentiating both sides of Equation 2 and solving for $V_1$ results in Equation 3 from which it is seen that voltage $V_1$ varies with the electrical size of condenser $C_0$, the transconductance or $g_m$ and of course the rate of change of the voltage across $C_0$.

Since the rate at which the output signal changes with respect to time is usually known when a circuit is being designed, that is, the range of frequencies of the input signal is usually known, the circuit may be adjusted so that the voltage $V_1$ is very much smaller than $V_0$ and thus may be ignored.

The voltage $V_2$ across condenser $C_2$, which may be determined in the same fashion as voltage $V_1$, is shown by Equation 4. It is equal to the first derivative of voltage $V_1$ multiplied by a constant and may be made very much smaller than voltage $V_1$. Consequently, while the input voltage $V_{in}$ is equal to the algebraic sum of voltages $V_0$, $V_1$ and $V_2$, in practice the input voltage is approximately equal to $V_0$ as expressed by Equation 5.

The circuit of FIGURE 10 may obviously be expanded by including additional amplifiers and condensers effectively connected in cascade so that higher orders of prediction are achieved. For example, FIGURE 12 illustrates a schematic arrangement for achieving third order prediction and output signals such as that shown in curves F and F' in FIGURES 1 and 2, respectively. It is apparent that the circuit of FIGURE 12 is very similar to that of FIGURE 10 with the incorporation of a third amplifier current source 13" having terminals 14"—16". Condenser $C_2$ in addition to being coupled between the input terminals of current source 13' is also coupled across the output terminals 16", 15" of source 13". Another condenser $C_3$ is coupled between input terminal 14" and common input-output terminal 16" of source 13". As in the arrangement of FIGURE 10 when switch 25 is closed, condensers $C_1$ and $C_2$ develop voltages representing at any given instant the first and second derivatives, respectively, of the output signal across condenser $C_0$. In like fashion, condenser $C_3$ compares the input signal from source 20 with the sum of the control effects developed across condensers $C_1$ and $C_2$ and also the output voltage to derive a control effect representing at any given instant the third derivative of the output signal. In other words, it provides a measure of the rate at which the time rate of change of slope varies.

Figure 13:
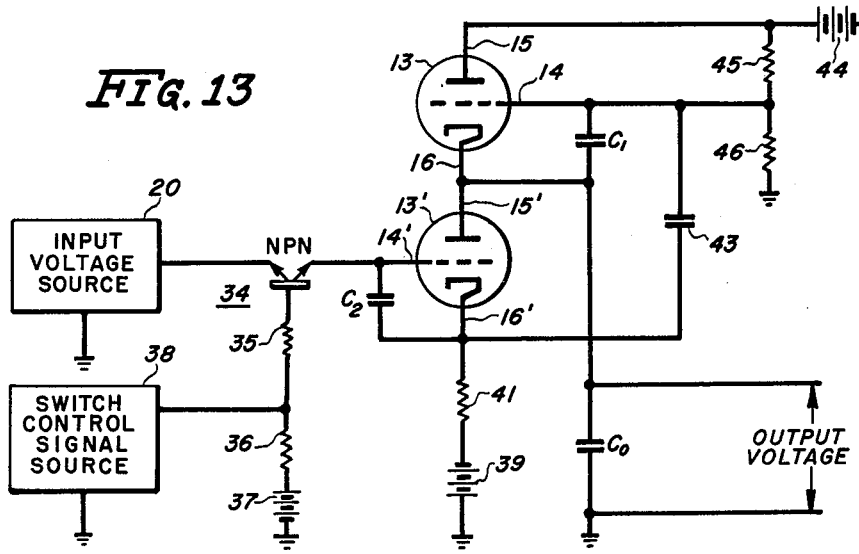
FIGURE 13 illustrates in detail one form which the device of FIGURE 10 may take.

A practical circuit for the second order predictor of FIGURE 10 is illustrated in FIGURE 13. Amplifiers 13 and 13' take the form of conventional triodes. One terminal of input voltage source 20 is connected to one collector of a conventional bilateral switching transistor 34 of the NPN type, the other collector of which is coupled to terminal 14' which is connected to the control grid of current source 13'. The base electrode of transistor 34 is coupled through a pair of series connected resistors 35 and 36 to the positive terminal of a source of unidirectional operating potential 37, the negative terminal of which is connected to ground. The junction of resistors 35 and 36 is connected to one output terminal of a switch control signal source 38, the other output terminal being connected to ground.

Transistor 34 takes the place of switch 25 and is normally rendered bilaterally conductive by virtue of the forward bias established on both junctions by potential source 37. Switch control signal source 38 is provided to develop a series of periodically recurring pulses of negative polarity in order to render switch transistor 34 non-conductive in response to each pulse. This, of course, has the same effect as opening switch 25. When source 20 supplies a decoded audio signal, such as that represented by waveform B in FIGURE 1, switch control signal source 38 provides pulse components each having a width equal to that represented by the prediction time interval in FIGURE 1 in order to delete the distortion components 11 and 12 of waveform B and to permit the extrapolator circuit to achieve second order prediction.

Specifically, source 38 may comprise circuitry shown in complete detail in copending application Serial No. 600,196. As there disclosed, the decoding signal employed to effect decoding (namely to achieve phase inverting at the correct instants) represents the code schedule according to which the received telecast is coded. It is utilized to produce a series of gating pulses each of which corresponds to and anticipates an assigned mode-changing or phase inverting interval, such as that represented by the prediction time interval in FIGURE 1.

Condenser $C_2$ in FIGURE 13 is coupled between the control grid and cathode of triode 13' and the cathode is connected to the negative terminal of a source of operating potential 39 through a resistor 41, units 39 and 41 constituting a high impedance source of constant current. The positive terminal of source 39 is connected to ground. The anode of tube 13' is connected to the cathode of triode 13. Condenser $C_1$ is coupled between the control grid and cathode of triode 13 and the grid of triode 13 is also coupled to the cathode of triode 13' through a D.C. blocking condenser 43. The plate of triode 13 is connected to the positive terminal of a source of unidirectional operating potential 44, the negative terminal being coupled to ground. A potential dividing arrangement comprising a pair of series connected resistors 45 and 46 is coupled across potential source 44. The junction of resistors 45 and 46 is coupled to the grid of triode 13 to establish an average voltage thereon. Output condenser $C_0$ is connected between the cathode of source 13 and ground.

By comparing the schematic of FIGURE 10 with the circuit of FIGURE 13 it is obvious that they are similar. The right side of the circuit of FIGURE 10 has been established at ground. Since condenser 43 is merely a D.C. blocking condenser and presents a very low impedance for all frequency components of a varying or alternating signal, condensers $C_2$, $C_1$ and $C_0$ are effectively connected in series and in the order named. As in the case of the schematic of FIGURE 10, condenser $C_1$ effectively compares the output voltage across condenser $C_0$ with the input voltage between the control grid of triode 13' and ground when transistor 34 is conducting. Condenser $C_1$ thus controls the current flow through triode 13 and thus the charge established on condenser $C_0$. Additionally, condenser $C_2$ compares the input voltage between the grid of triode 13' and ground with the sum of the output voltage across condenser $C_0$ and the voltage across condenser $C_1$ to provide a voltage proportionate to the second derivative of the output signal. Triode 13' is thus operated in accordance therewith to effectively vary the voltage across condenser $C_1$.

Transistor 34, which is normally conductive due to the forward bias of source 37, is rendered non-conductive in response to each pulse from source 38 and thus during the interval of each pulse component the circuit of FIGURE 13 achieves extrapolation.

Once again, it is essential to provide relatively low shunting impedances for the condensers in the input and output circuits of each of amplifiers 13′ and 13 while transistor 34 is conducting while at the same time providing relatively high shunting impedances when the transistor is not conducting. With transistor 34 conducting, a low shunting impedance is insured for condenser $C_0$ and also for condenser $C_1$ because of the degeneration introduced into the circuits of triodes 13 and 13′, respectively. Condenser $C_2$ is provided with a low shunting impedance when transistor 34 is conducting since the total impedance of the series circuit including condensers 43, $C_1$ and $C_0$ and the output of source 20 is low.

With the transistor in its non-conducting state, the impedance shunting condenser $C_0$ is high. Actually, there are three parallel shunting paths for condenser $C_0$ but the impedance of each is relatively high. One shunting path for condenser $C_0$ includes the high plate resistance of triode 13, another path includes condenser $C_1$ in series with the parallel combination of resistors 41, 45 and 46, but these resistors may be made high, and the third path includes the plate resistance of triode 13′ in series with the parallel combination of resistors 41, 45 and 46. Condenser $C_1$ has a high shunting impedance when transistor 34 is not conducting made up of three high impedance parallel paths, one containing the internal plate resistance of triode 13′, another containing high resistance resistor 46 and another containing high resistance resistor 45. With transistor 34 effectively open, the shunting impedance for condenser $C_2$ is high since it is merely shunted by input terminals 14′ and 16′.

The following circuit parameters were employed in a circuit constructed and satisfactorily operated in accordance with FIGURE 13:

| | | |
|---|---|---|
| Transistor 34 | | 2N94A |
| Resistor 35 | ohms | 39K |
| Resistor 36 | do | 1M |
| Source 37 | volts | +300 |
| Triodes 13 and 13′ | | 12AT7 |
| Condenser $C_2$ | microfarads | .01 |
| Resistor 41 | ohms | 60K |
| Source 39 | volts | −300 |
| Condenser $C_1$ | microfarads | .01 |
| Condenser 43 | do | .5 |
| Resistor 45 | ohms | 1M |
| Resistor 46 | do | 1M |
| Condenser $C_0$ | microfarads | .01 |
| Source 44 | volts | +300 |

Figure 14:
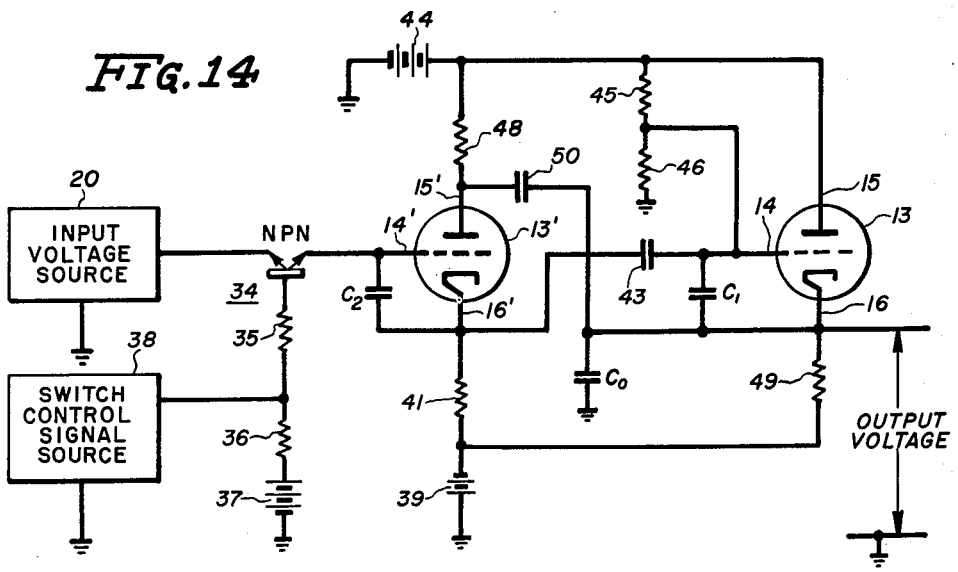
FIGURES 14 and 15 show other forms which the extrapolator of FIGURE 10 may take.

FIGURE 14 shows another practical circuit of the schematic of FIGURE 10 and is modified somewhat from that of FIGURE 13. The basic difference between the circuits of these figures is that triodes 13 and 13′ are fed in shunt rather than in series. The plate of triode 13′ in FIGURE 14 is connected to the positive terminal of source 44 through a load resistor 48, and the plate of source 13 is connected directly to the positive terminal of source 44. The cathode of triode 13 is connected through a cathode resistor 49 to the negative terminal of source 39. A D.C. blocking condenser 50 is coupled between the plate of source 13′ and the cathode of triode 13.

As in the case of FIGURE 13, condensers $C_2$, $C_1$ and $C_0$ are coupled in series across the input voltage source. Similarly, condenser $C_1$ effectively determines the first derivative of the output signal and condenser $C_2$ determines its second derivative. The voltages across condensers $C_1$ and $C_2$, subsequent to an interruption of transistor 34 (namely during an interval when source 38 causes the transistor to be non-conductive), cause the wave shape of the output voltage across condenser $C_0$ to be determined by the first and second derivatives of the output signal just prior to the interruption.

Once again, short and long time constants are provided for the condensers in the input and output circuits of triodes 13′ and 13 during the conduction and non-conduction intervals, respectively, of transistor 34. With the transistor conducting, condenser $C_0$ has a relatively low apparent shunting impedance as a result of the degeneration around triode 13. Condenser $C_1$ at that time has a low shunting impedance due to the degeneration existing around triode 13′. The shunting impedance of condenser $C_2$ is low since it again comprises the series arrangement of the impedances shunting condensers $C_1$, and $C_0$ and the low output impedance of source 20.

With transistor switch 34 open or interrupted in FIGURE 14, condenser $C_0$ has across it the relatively high impedance parallel paths containing resistor 49 which may be of high resistance, resistor 41 which also may be of high resistance, resistors 48, 45 and 46 in series each of which also may be of high resistance, and the plate resistance of tube 13′ in series with resistor 41. With transistor 34 not conducting, condenser $C_1$ is provided with a high impedance shunting circuit including the plate resistance of triode 13′ in parallel with high resistance resistor 46. At the same time, condenser $C_2$ has a high shunting impedance made up simply of the high impedance between input terminals 14′ and 16′.

The circuit of FIGURE 14, including the following components, has been constructed and operated very satisfactorily:

| | | |
|---|---|---|
| Transistor 34 | | 2N94A |
| Resistor 35 | ohms | 39K |
| Resistor 36 | do | 1M |
| Source 37 | volts | +250 |
| Condenser $C_2$ | microfarads | .01 |
| Resistor 41 | ohms | 33K |
| Source 39 | volts | −100 |
| Triodes 13′ and 13 | | 12AT7 |
| Resistor 48 | ohms | 47K |
| Source 44 | volts | +250 |
| Condenser 50 | microfarads | .5 |
| Condenser $C_0$ | do | .01 |
| Condenser 43 | do | .5 |
| Condenser $C_1$ | do | .01 |
| Resistor 45 | ohms | 1M |
| Resistor 46 | do | 1M |
| Resistor 49 | do | 60K |

Figure 15:
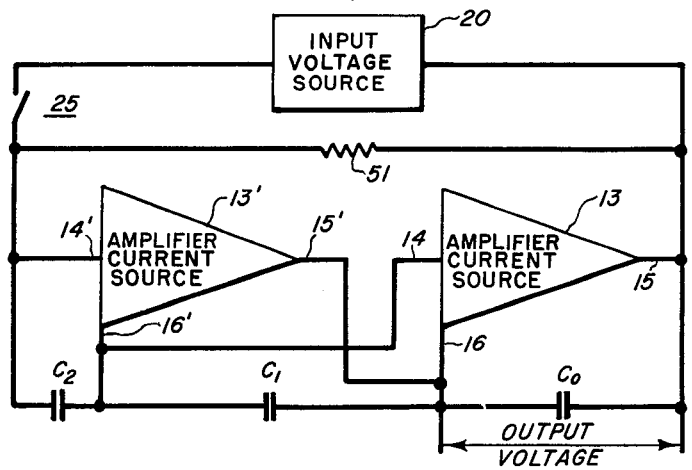

As mentioned hereinbefore, it is usually desirable to insure that the impedance across condensers $C_0$, $C_1$ and $C_2$ be relatively high, when switch 25 is open, so that during the interval in which prediction is to be made the stored control effects are not drained off or altered due to a leakage path. If a leakage path is provided across the condensers, so that the time constants of the input and output circuits of each amplifier 13, 13′ are reduced, when second order prediction is being made, the waveform will not assume a shape strictly determined by the second derivative but will be altered slightly with respect thereto. An examination of curves E and E′ in FIGURES 1 and 2, respectively, suggests that if a leakage path is purposely provided and properly adjusted, the wave shape during the prediction time interval may actually be made to more closely follow a true sinusoidal shape, in other words to achieve the results obtained by third order prediction as shown by curves F and F′. To this end, FIGURE 10 may be modified as shown in FIGURE 15 by the addition of a leakage resistor 51 connected between input terminal 14′ of signal-translating device 13′ and output terminal 15 of signal-translating device 13. Resistor 51 thus provides a leakage path shunting condensers $C_0$, $C_1$ and $C_2$ so that during the prediction time the charges on the various condensers will leak off. The presence of resistor 51 tends to bring the lefthand terminal of condenser $C_2$ in FIGURE 15 at the potential established at the righthand terminal of the resistor. Condenser $C_2$ thus either charges or discharges through resistor 51 depending on whether the potential at the righthand terminal of the resistor is higher or lower than that established on the condenser at the time. In charging or discharging, the voltage or control effect across condenser $C_2$ thus varies which in turn varies the conductive condition of amplifier 13' to change the voltage across condenser $C_1$ such that the lefthand terminal of condenser $C_1$ approaches the potential on the right of resistor 41. Similarly, the changing voltage across condenser $C_1$ changes the conductive condition of amplifier 13, causing the voltage across condenser $C_0$ to also change such that the lefthand terminal of condenser $C_0$ tends to approach the potential established at the righthand terminal of resistor 51. If the right side of resistor 51 is established at ground for reference purposes, the potential on the left side of condenser $C_0$ will curve toward zero or ground potential. Since the variation introduced in the wave shape of the output voltage is effectively dependent on the frequency of the input signal, the electrical size of resistor 51 is selected in accordance with the band of frequencies in which the most accurate prediction is desired. In other words, resistor 51 is adjusted in order to establish each of the time constants of the input and output circuits of the amplifier during the prediction interval at a value such that the control effects vary at a rate commensurate with the frequency or frequencies of the input signal.

Figure 16:
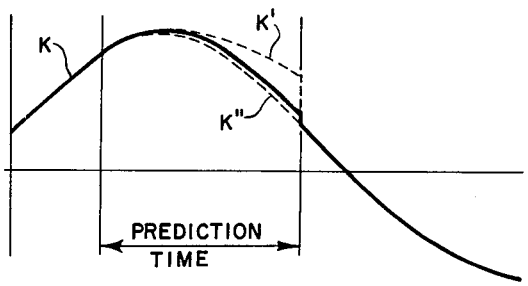
FIGURE 16 is a wave form presentation convenient in explaining the operation of the arrangement of FIGURE 15.

Turning now to FIGURE 16, waveform K represents an output signal developed across condenser $C_0$ in FIGURE 15. In the absence of leakage resistance 51 the arrangement of FIGURE 15 would achieve second order prediction and the output signal would follow the path indicated by the dashed line K' during the prediction interval. With resistor 51 present, and of course adjusted to be of appropriate size commensurate with the frequency of the input signal, waveform K is purposely curved in the direction of the curvature of the input signal during the prediction time as shown by the solid line construction. Dashed line "K" indicates the true wave form desired.

It has been found that a certain amount of bending or curvature in the desired direction to effectively optimize prediction is achieved by shunting either output load $C_0$ or input condenser $C_1$ or input condenser $C_2$.

Figure 17:
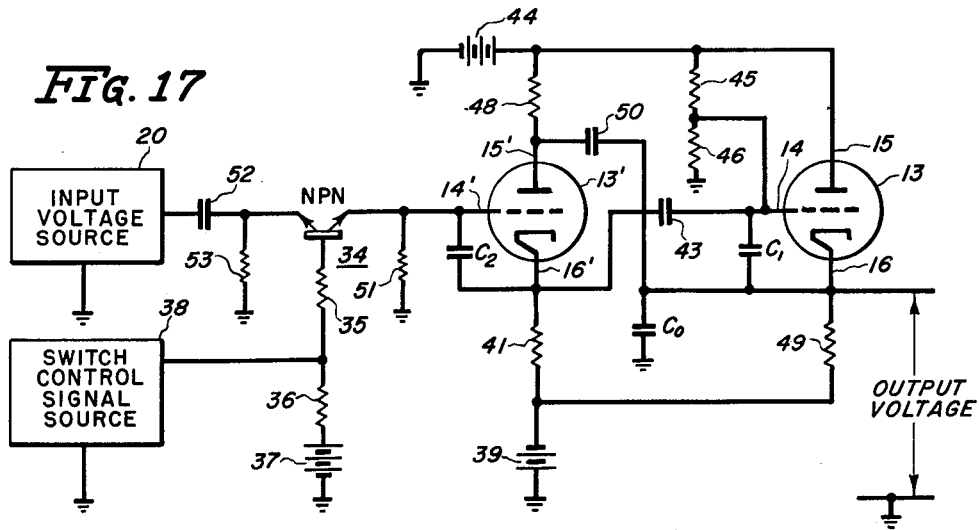
FIGURE 17 is one detailed circuit diagram of the extrapolator of FIGURE 15.

It is essential, of course, to insure that the bending or curving introduced by the arrangement of FIGURE 15 is in the direction in which the input signal is curving during the prediction time. If the A.C. axis of the input signal is at zero or ground potential, then resistor 51 may be inserted in the circuit of FIGURE 14 as shown in FIGURE 17. In the latter figure, resistor 51 is connected between terminal 14' and ground. A condenser 52 has been inserted between source 20 and transistor 34 and a resistor 53 has been connected between the junction of condenser 52 and the transistor to ground merely to indicate that the input signal varies around zero. Resistor 51 in FIGURE 17 tends to establish the ungrounded or top terminal of condenser $C_0$ at ground potential and serves as a charging path when the potential on the condenser is negative with respect to zero or ground potential and as a discharging path when the voltage on condenser $C_0$ is positive compared to ground.

With the circuit of FIGURE 17, each time transistor 34 is interrupted or rendered non-conductive, condensers $C_0$, $C_1$ and $C_2$ are permitted to discharge slightly toward zero through resistor 51 to achieve the results shown by the solid construction of waveform K in FIGURE 16, assuming waveform K varies around a zero axis. Of course, if the prediction interval starts at a time when waveform K is below the zero axis, condensers $C_0$, $C_1$ and $C_2$ will charge through resistor 51.

Figure 18:
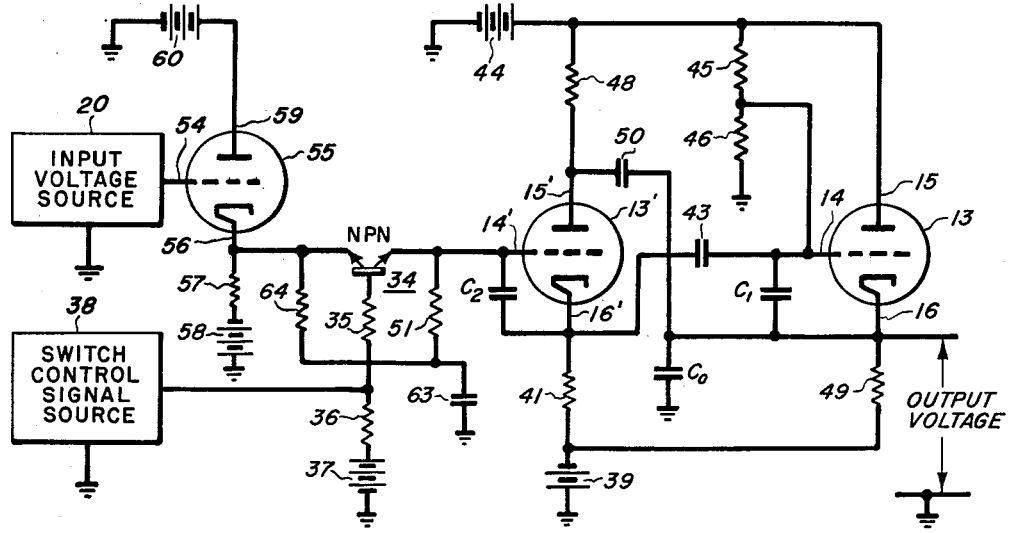
FIGURE 18 is another detailed circuit diagram showing a slightly different form of the arrangement of FIGURE 15.

Assuming that the input voltage from source 20 varies around a D.C. or unidirectional term or component, it is then necessary to insure that the bending introduced proceeds in the direction toward that D.C. component or term. To this end, the circuit of FIGURE 14 may be modified as shown in FIGURE 18. A cathode follower is inserted between source 20 and transistor 34 in order to illustrate one practical case in which such D.C. component is present. It should be appreciated that the cathode follower is shown only to indicate that the input signal has a D.C. component. Specifically, the ungrounded terminal of source 20 is coupled to the control grid 54 of a triode 55. Cathode 56 of the triode is connected through a resistor 57 to the negative terminal of a source of unidirectional operating potential 58, the positive terminal of which is connected to ground. Plate 59 of cathode follower triode 55 is coupled to the positive terminal of a source of unidirectional operating potential 60 whose negative terminal is connected to ground. Cathode 56, in addition to being connected to a collector of switch 34, is connected to one terminal of a condenser 63 through a resistor 64, the other terminal of the condenser being grounded. Leakage resistor 51 is coupled between the control grid of tube 13' and the junction between resistor 64 and condenser 63. The combination of resistor 64 and condenser 63 should be adjusted, with respect to electrical size, so that they provide a time constant large compared to the lowest frequency component of the input signal.

With this arrangement, the D.C. term or component developed at cathode 56 is conveyed to condenser 63 by means of resistor 64. Condenser 63 is therefore always charged to the average value of the input signal which, of course, is the D.C. component of the input signal. Consequently, during the prediction time when switch 34 is rendered non-conductive leakage resistor 51 serves to either charge or discharge slightly condensers $C_1$, $C_2$ and $C_0$ in the direction toward the potential established on condenser 63 and thus toward the D.C. level of the input signal from source 20. Bending or curving is thus introduced always in the direction towards the A.C. axis of the input signal whether that axis is at ground potential or not.

Figure 20:
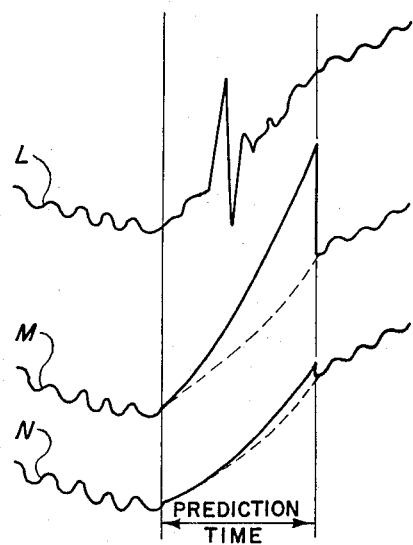
FIGURE 20 shows various signal wave forms useful in describing the operation of the circuit of FIGURE 19.

Since the extrapolators discussed heretofore achieve prediction during the prediction time interval based on the particular wave shape of the output signal just prior to that interval, if any undesired noise is present at that time, the predicted wave shape may possibly be erroneous. The wave forms of FIGURE 20 illustrate how false prediction may result from undesired high frequency noise components superimposed on the desired input signal, which of course except during the prediction interval is essentially the same as the output signal. Curve L in FIGURE 20 shows a waveform having a relatively low frequency to which high frequency noise distortion is added. During the prediction time interval shown, there is transient distortion of the type shown in curves B and B' in FIGURES 1 and 2, respectively.

Waveform M illustrates what happens if second order prediction is achieved by any of the circuits previously described in response to the input signal of curve L. The predicted wave form is false due to the fact that it is based on the wave shape of a high frequency component occurring just prior to the prediction time.

If the signal of waveform L is translated through a low-pass filter before its application to the prediction circuit, the undesired high frequency components are removed but the switching transient during the prediction time is widened out considerably on a time basis to the extent that it may embrace or overlap the prediction time interval. That being the case, a low-pass filter in the output of input voltage source 20 is not the answer to the problem presented.

Figure 19:
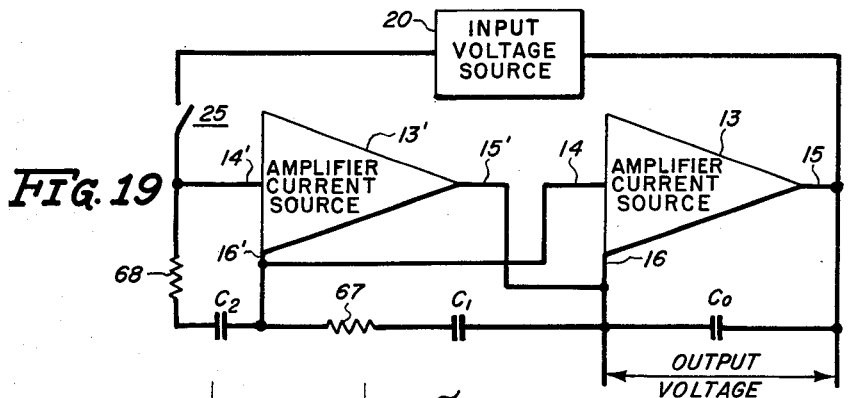
FIGURE 19 illustrates a modified version of the extrapolator of FIGURE 10 and represents an additional embodiment of the invention.

The arrangement of FIGURE 19 is similar to that shown in FIGURE 10 with the addition of resistors 67 and 68 in series with condensers $C_1$ and $C_2$, respectively. The resistor-condenser combinations serve as low-pass filters, with respect to the memory devices for the inputs of amplifiers 13 and 13', to effectively "smooth out" the applied signals to their average low frequency variations so that when switch 25 is opened prediction is based on the desired low frequency information only. Considering only the two resistor-condenser combinations, ignoring all other circuitry, each combination exhibits a frequency response characteritsic having a roll-off point (namely, the frequency at which the response begins to decrease or drop appreciably such that it is three decibels down) such that only relatively low frequency signals representing desired information fall under or precede the roll-off point and thus produce voltages across the condenser portion of the combination. With switch 25 closed, the control effect instantaneously stored in condenser $C_1$ is thus only that part of the first derivative of the output voltage which falls under the roll-off point of the frequency response characteristic of resistor 67 and condenser $C_1$, while the control effect stored in $C_2$ is only that part of the second derivative which is under the roll-off point of the response characteristic of resistor 68 and condenser $C_2$.

More specifically, each low-pass filter derives two control effects. The series combination of resistor 67 and condenser $C_1$, for example, derives one control effect representing at any given instant the rate at which the output voltage is changing with respect to time, while condenser $C_1$ alone derives a control effect representing at any given instant the rate at which the desired low frequency component only is changing with respect to time. Except during the prediction time, the control effect across both condenser $C_1$ and resistor 67 in series signal-translating device 13 and thus the output signal is a simulation of the input signal. However, when switch 25 is opened, the low frequency control effect which is stored in condenser $C_1$, just prior to the switch opening, controls amplifier 13 so that the output signal during the prediction time is based only on the low frequency component.

With the arrangement of FIGURE 19, an input signal, like that shown as curve L in FIGURE 20, results in an output signal like curve N. During the prediction time of curve N the waveform very closely approximates or simulates the low frequency desired signal and is obviously an improvement over the signal of waveform M.

The invention provides, therefore, a novel predictor which replaces a deleted portion of a signal by an extrapolated waveform based on the particular wave shape of the signal immediately preceding the deletion.

While particular embodiments of the invention have been shown and described, modifications may be made, and it is intended in the appended claims to cover all such modifications as may fall within the true spirit and scope of the invention.

I claim:

1. An extrapolator for determining from the wave shape of a signal during a reference time interval the wave shape of that signal throughout a succeeding time interval, comprising: a source of a varying input signal; an output load for developing an output signal; means, including a signal-translating device, for coupling said source to said load and for comparing said input and output signals to derive a control effect representing at any given instant the rate at which said output signal is changing with respect to time; means for applying said control effect to said signal-translating device to cause the wave shape of said output signal to simulate that of said input signal; and means for effectively interrupting said coupling means subsequent to a reference time interval while maintaining said signal-translating device under the control of the control effect derived immediately prior to the interruption.

2. An extrapolator for determining from the wave shape of a signal during a reference time interval the wave shape of that signal throughout a succeeding time interval, comprising: a source of a varying input signal; a reactive storage output load for developing an output signal which is phase displaced with respect to said input signal; means, including a signal-translating device, for coupling said source to said load and further including a reactive storage input circuit for comparing said input and output signals to derive a control effect having a magnitude proportional to said phase displacement and representing at any given instant the rate at which said output signal is changing with respect to time; means for applying said control effect to said signal-translating device to cause the wave shape of said output signal to simulate that of said input signal; and means for effectively interrupting said coupling means subsequent to a reference time interval while maintaining said signal-translating device under the control of the control effect derived immediately prior to the interruption.

3. An extrapolator for determining from the wave shape of a signal during a reference time interval the wave shape of that signal throughout a succeeding prediction time interval of a predetermined duration, comprising: a source of a varying input signal; an output load for developing an output signal; means for coupling said source to said load, including a signal-translating device having a reactive input circuit and a reactive output circuit, and for comparing said input and output signals to derive a control effect representing at any given instant the rate at which said output signal is changing with respect to time, said input and output circuits each having a time constant short relative to said prediction interval; means for applying said control effect to said signal-translating device to cause the wave shape of said output signal to simulate that of said input signal; means for effectively interrupting said coupling means during said prediction time interval while maintaining said signal-translating device under the control of the control effect derived immediately prior to the interruption; and means for effectively increasing each of said time constants during said prediction time interval to a value that is long with respect to said prediction time interval.

4. An extrapolator for determining from the wave shape of a signal during a reference time interval the wave shape of that signal throughout a succeeding prediction time interval of a predetermined duration, comprising: a source of a varying input signal; a capacitive storage output load for developing an output signal; means for coupling said source to said load and including a degenerative signal-translating device providing for said capacitive load a time constant short relative to said prediction time interval; signal-comparison means coupled to said source and to said load, and including a condenser exhibiting in conjunction with said device a time constant short relative to said prediction time interval, for comparing said input and output signals to derive a control effect representing at any given instant the rate at which said output signal is changing with respect to time; means for applying said control effect to said signal-translating device to cause the wave shape of said output signal to simulate that of said input signal; means for effectively interrupting said coupling means during said prediction time interval while maintaining said signal-translating device under the control of the control effect derived immediately prior to the interruption; and means for effectively increasing said time constants during said prediction time interval such that each is long with respect to said prediction time interval.

5. An extrapolator for determining from the wave shape of a signal during a reference time interval the wave shape of that signal throughout a succeeding time interval, comprising: a signal-translating device having an input terminal, an output terminal and a common input-output terminal; means for applying a varying input signal to said input terminal; an output load coupled to said common input-output terminal and to said output terminal for developing an output signal; feedback means coupled to said input terminal and to said common input-output terminal for comparing said input and output signals to derive a control effect representing at any given instant the rate at which said output signal is changing with respect to time and for applying said control effect to said input terminal to cause the wave shape of said output signal to simulate that of said input signal; and means for effectively interrupting the application of said input signal to said input terminal subsequent to a reference time interval while maintaining said signal-translating device under the control of the control effect derived immediately prior to the interruption.

6. An extrapolator for determining from the wave shape of a signal during a time interval the wave shape of that signal throughout a succeeding time interval, comprising: a source of a varying decoded intelligence signal containing undesired distortion components during spaced mode-changing intervals; an output load for developing an output signal; means, including a signal-translating device, for coupling said source to said load and for comparing said decoded intelligence signal and said output signal to derive a control effect representing at any given instant the rate at which said output signal is changing with respect to time; means for applying said control effect to said signal-translating device to cause the wave shape of said output signal to simulate that of said intelligence signal; and means for effectively interrupting said coupling means throughout each of said mode-changing intervals while maintaining said signal-translating device under the control of the control effect derived immediately prior thereto.

7. An extrapolator for determining from the wave shape of a signal during a reference time interval the wave shape of that signal throughout a succeeding time interval, comprising: a source of a varying input signal; signal-translating means including an output load for developing an output signal which is a substantial replica of said input signal; means coupled to said source and load for comparing said input and output signals to derive a control effect representing at any given instant the first derivative of said output signal; and means for effectively interrupting said input signal subsequent to a reference time interval while controlling said signal translating means to cause said output signal to assume a wave shape, subsequent to the interruption, determined at least in part by the first derivative derived immediately prior to the interruption.

8. An extrapolator for determining from the wave shape of a signal during a reference time interval the wave shape of that signal throughout a succeeding time interval, comprising: a source of a varying input signal; signal-translating means including an output load for developing an output signal which is a substantial replica of said input signal; a series of comparison devices coupled between said source and load for deriving control effects respectively corresponding at any given instant to successive time derivatives of said output signal; and means for effectively interrupting said input signal subsequent to a reference time interval while controlling said signal-translating means to cause said output signal to assume a wave shape, subsequent to the interruption, determined at least in part by the successive time derivatives derived immediately prior to the interruption.

9. An extrapolator for determining from the wave shape of a signal during a reference time interval the wave shape of that signal throughout a succeeding time interval, comprising: a source of a varying input signal; signal-translating means including an output load for developing an output signal which is a substantial replica of said input signal; first means coupled to said source and load for comparing said input and output signals to derive a first control effect representing at any given instant the first derivative of said output signal; second means coupled to said source and to said first means for comparing said input signal with the sum of said output signal and said first control effect to derive a second control effect representing at any given instant the second derivative of said output signal; and means for effectively interrupting said input signal subsequent to a reference time interval while controlling said signal-translating means to cause said output signal to assume a wave shape, subsequent to the interruption, determined at least in part by the second derivative derived immediately prior to the interruption.

10. An extrapolator for determining from the wave shape of a signal during a reference time interval the wave shape of that signal throughout a succeeding time interval, comprising: a source of a varying input signal; signal-translating means including an output load for developing an output signal which is a substantial replica of said input signal; first means coupled to said source and load for comparing said input and output signals to derive a first control effect representing at any given instant the first derivative of said output signal; second means coupled to said source and to said first means for comparing said input signal with the sum of said output signal and said first control effect to derive a second control effect representing at any given instant the second derivative of said output signal; third means coupled to said source and to said second means for comparing said input signal with the sum of said output signal, said first control effect and said second control effect to derive a third control effect representing at any given instant the third derivative of said output signal; and means for effectively interrupting said input signal subsequent to a reference time interval while controlling said signal-translating means to cause said output signal to assume a wave shape, subsequent to the interruption, determined at least in part by the third derivative derived immediately prior to the interruption.

11. An extrapolator for determining from the wave shape of a signal during a reference time interval the wave shape of that signal throughout a succeeding time interval, comprising: a source of a varying input signal; a first load for developing an output signal; means, including a first signal-translating device and a second load, for coupling said source to said first load and for comparing said input and output signals to derive in said second load a first control effect representing at any given instant the rate at which said output signal is changing with respect to time; means for applying said first control effect to said first signal-translating device; means, including a second signal-translating device, for coupling said source to said second load and for comparing said input signal with the sum of said output signal and said first control effect to derive a second control effect representing at any given instant the rate at which the time rate of change of said output signal is varying with respect to time; means for applying said second control effect to said second signal-translating device; and means for effectively interrupting both said coupling means subsequent to a reference time interval while maintaining said first signal-translating device effectively under the control of both the first and second control effects and said second signal-translating device under the control of the second control effect derived immediately prior to the interruption.

12. An extrapolator for determining from the wave shape of a signal during a reference time interval the wave shape of that signal throughout a succeeding time interval, comprising: a source of a varying input signal; a first signal-translating device having an input terminal, an output terminal and a common input-output terminal; means including a switching device and one condenser for applying said varying input signal ot the input terminal of said first device; an output load condenser coupled to the common input-output terminal and to the output terminal of said first device for developing an output signal; a feedback condenser coupling the input terminal of said first device to the common input-out terminal of said first device for comparing said input and output signals to derive a first control effect representing at any given instant the rate a which said ouput signal is changing with respect to time; a second signal-translating device having an input terminal, an output terminal and a common input-output terminal; means coupling the output terminal of said second device to the common input-output terminal of said first device; second feedback means including said one condenser coupling the common input-output terminal of said second device to the input terminal of said second device for comparing said input signal with the sum of said output signal and said first control effect to derive a second control effect representing at any given instant the second derivative of said output signal and for applying said input signal and said second control effect to the input terminal of said second device; and means for operating said switching device to effectively interrupt the application of said input signal to the input terminal of each of said signal translating devices subsequent to the reference time interval.

13. An extrapolator for determining from the wave shape of a signal during a reference time interval the wave shape of that signal throughout a succeeding prediction time interval, comprising: a source of a varying input signal having components lying in a predetermined portion of the frequency spectrum; an output load for developing an output signal; means for coupling said source to said load, including a degenerative signal-translating device having a feedback path, a reactive storage input circuit and a reactive storage output circuit, and for comparing said input and output signals ot derive a control effect representing at any given instant the rate at which said output signal is changing with respect to time, said feedback path resulting in each of said input and output circuits having a time constant short relative to said prediction interval; means for applying said control effect to said signal-translating device to cause the wave shape of said output signal to simulate that of said input signal; means for effectively interrupting said coupling means and said feedback path during said prediction time interval while maintaining said signal-translating device under the control of the control effect derived immediately prior to the interruption; and a leakage circuit shunting at least one of said reactive storage circuits for establishing each of said time constants during said prediction interval at a value such that the control effect controlling said signal-translating device subsequent to the interruption varies at a rate commensurate with the frequencies in said predetermined portion of the spectrum.

14. An extrapolator for determining from the wave shape of a signal during a reference time interval the wave shape of that signal throughout a prediction time interval, comprising: a source of a varying input signal having components lying in a predetermined portion of the frequency spectrum and having a direct current as well as an alternating current component; a reactive storage output load for developing an output signal; means for coupling said source to said load, including a degenerative signal-translating device having a feedback path, and a reactive storage input circuit and a reactive storage output circuit, and for comparing said input and output signals to derive a control effect representing at any given instant the rate at which said output signal is changing with respect to time, said feedback path resulting in each of said input and output circuits having a time constant short relative to said prediction interval; means for applying said control effect to said signal-translating device to cause the wave shape of said output signal to simulate that of said input signal; means for effectively interrupting said coupling means and said feedback path during said prediction time interval while maintaining said signal-translating device under the control of the control effect derived immediately prior to the interruption; means coupled to said input signal source for developing a potential having a magnitude determined by said direct current component; and a leakage circuit coupled to said potential developing means shunting said output load and said input circuit for establishing each of said time constants during said prediction interval at a value such that the control effect controlling said signal-translating device subsequent to the interruption varies in a sense such as to cause the wave shape of said output signal to curve toward said direct current component at a rate commensurate with the freqeuncies in said predetermined portion of the spectrum.

15. An extrapolator for determining from the wave shape of a signal during a reference time interval the wave shape of that signal throughout a succeeding time interval, comprising: a source of a varying input signal having a relatively low frequency desired component on which is superimposed relatively high frequency undesired components; an output load for developing an output signal; means, including a signal-translating device and a low-pass filter, for coupling said source to said load and for comparing said input and output signals to derive one control effect representing at any given instant the rate at which said output signal is changing with respect to time and another control effect representing at any given instant the rate at which said low frequency desired component is changing with respect to time; means for applying said one control effect to said signal-translating device to cause the wave shape of said output signal to simulate that of said input signal, said output signal thereby including said undesired high frequency components; and means for effectively interrupting said coupling means subsequent to a reference time interval and for applying said other control effect to said signal-translating device to maintain it under the control of the other control effect derived immediately prior to the interruption.

16. An extrapolator for determining from the wave shape of a varying input voltage during a reference time interval the wave shape of that voltage throughout a succeeding time interval, comprising: means for developing an output signal which is essentially a replica of said input signal but is phase displaced with respect thereto; means for comparing said input and output signals to derive a control effect representing at any given instant the rate at which said output signal is changing with respect to time; means for utilizing said control effect to control the wave shape of said output signal; and means for interrupting said input signal subsequent to a reference time interval while maintaining the wave shape of said output signal under the control of the control effect derived immediately prior to the interruption.

17. An extrapolator for determining from the wave shape of a varying input voltage during a reference time interval the wave shape of that voltage throughout a succeeding time interval, comprising: means for developing an output voltage which is essentially a replica of said input voltage but is phase displaced with respect thereto; means for comparing said input and output voltages to derive a first control effect representing at any given instant the first derivative of said output voltage; means for utilizing said first control effect to at least partially control the wave shape of said output voltage; means for comparing said input voltage with the sum of said output voltage and said first control effect to derive a second control effect representing at any given instant the second derivative of said output voltage; means for utilizing said second control effect to at least partially control the wave shape of said output voltage; and means for interrupting said input voltage subsequent to a reference time interval while maintaining the wave shape of said output voltage under the control of both the first and second control effects derived immediately prior to the interruption.

18. An extrapolator for determining from the wave shape of a varying input voltage during a reference time interval the wave shape of that voltage throughout a succeeding time interval, comprising: means for developing an output voltage which is essentially a replica of said input voltage; means for comparing said input and output voltages to derive a series of control effects respectively corresponding at any given instant to successive time derivatives of said output voltage; means for utilizing said control effects to control the wave shape of said output voltage; and means for interrupting said input voltage subsequent to a reference time interval while maintaining the wave shape of said output voltage under the control of the control effects derived immediately prior to the interruption.

19. An arrangement for developing a control potential comprising: a high impedance, constant current source; a controllable unidirectional conductive device in series with said constant current source; a condenser in parallel with said device and with said constant current source; and means for impressing a varying control voltage on said device to vary its conductivity such that the voltage on said condenser changes in one sense with control voltage variations of one sense and in opposite sense with control voltage variations of opposite sense.

References Cited in the file of this patent
UNITED STATES PATENTS

| | | |
|---|---|---|
| 2,200,233 | Whitehead | May 7, 1940 |
| 2,435,753 | Richter et al. | Feb. 10, 1948 |
| 2,505,549 | Jones | Apr. 25, 1950 |
| 2,789,254 | Bodle et al. | Apr. 16, 1957 |

OTHER REFERENCES

Appendix before the F.C.C., pp. 1–16 (Appendix to comments of Zenith Radio Corporation and Teco Inc.).

Korn and Korn: "Electronic Analog Computers," 2d ed., McGraw-Hill Co., 1956; pp. 217 and 385 relied on, Figs. 5.27b and 7.30.